J. P. ANDERSON.
CLENCH PINCERS.
APPLICATION FILED OCT. 20, 1915.
1,166,420.  Patented Jan. 4, 1916.
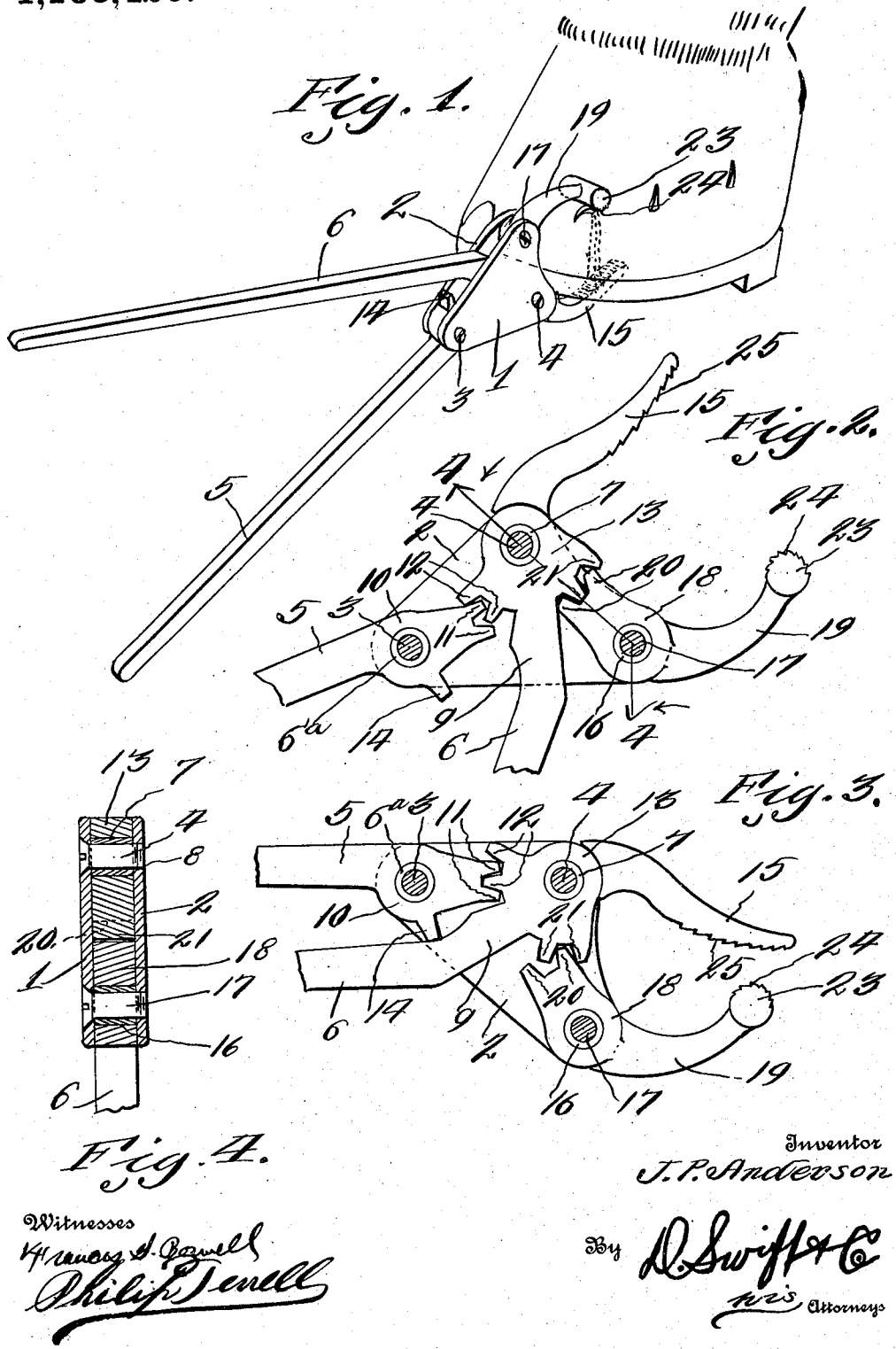
Inventor
J. P. Anderson

UNITED STATES PATENT OFFICE.

JENS P. ANDERSON, OF JAMESTOWN, KANSAS.

CLENCH-PINCERS.

1,166,420.  Specification of Letters Patent.  Patented Jan. 4, 1916.

Application filed October 20, 1915. Serial No. 56,903.

*To all whom it may concern:*

Be it known that I, JENS P. ANDERSON, a citizen of the United States, residing at Jamestown, in the county of Cloud, State of Kansas, have invented new and useful Clench-Pincers; and I do hereby declare the following to be a full, clear, and exact description of the invention, such as will enable others skilled in the art to which it appertains to make and use the same.

This invention relates to an improved pair of clench pincers designed for use by blacksmiths and the like, for clenching or bending horseshoe nails, and an object of the invention is to provide a simple, efficient and practical tool, which may be manufactured for a slight cost.

Another object of the invention is to provide a pair of correspondingly constructed plates, between which, a pair of levers is pivoted, one lever having gear connections with the other, which in turn terminates in a clenching jaw, and which also has gear connections with a second clenching jaw, so that by manipulating the levers toward and from each other, said jaws are correspondingly operated, for clenching horseshoe nails, in the manner shown in the drawings.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in perspective showing the clench pincers in the act of being used for clenching a horseshoe nail. Fig. 2 is a side elevation and partly in section showing the pincers for clenching a horseshoe nail in a different manner. Fig. 3 is a view in section and partly in elevation similar to Fig. 2, but showing the jaws closed. Fig. 4 is a sectional view on line 4—4 of Fig. 2, showing how the screws are threaded into one of the plates.

Referring more especially to the drawings, 1 and 2 designate two correspondingly constructed plates, between which, and upon the pivot screws 3 and 4, the levers 5 and 6 are pivoted, the pivot screws 3 and 4 pass through bushings 6ᵃ and 7, on which the levers pivot. Said screws are threaded into one of the plates as shown at 8. The lever 6 where it is pivoted between the plates overlies the pivoted end of the lever 5, which is caused by an angular portion 9 of the lever 6. The pivoted head 10 of the lever 5 beyond its pivot is provided with gear teeth 11 to mesh with the gear teeth 12 of the pivoted head 13 of the lever 6. The head 10 of the lever 5 has a single tooth 14 spaced from the teeth 11, and is designed to contact with the lever 6, so as to limit the levers 5 and 6 in their movements toward each other. The pivoted head 13 beyond its pivot terminates in an elongated partially compound curved clenching jaw 15, which is offset out of alinement with the lever 6, as shown. Pivoted upon a bushing 16, which is mounted upon a screw 17 extending through said plate and threaded into one of the plates, is the body portion 18 of a jaw member 19. The body portion 18 of the jaw member 19 has gear teeth 20 meshing with gear teeth 21 of the head 13 of the lever 6. The gear teeth 21 are upon the opposite side of the angular portion of the lever 6 to the gear teeth 12, so that when the levers 5 and 6 are moved toward and from each other, the jaw member 19 and the jaw 15 are correspondingly moved. The jaw member 19 terminates in a cylindrical jaw 23, a portion of the cylindrical surface of which has ratchet teeth 24 to coöperate with the ratchet teeth 25 of the jaw 15. It will be observed that the single tooth of the head 10 of the lever 5 not only limits the levers 5 and 6 when moved toward each other, but also causes the jaws 15 and 23 to be limited a certain distance apart. As shown in the drawings, the two jaws may be used in two different ways for clenching horseshoe nails. When the jaws are used as shown in Fig. 1 for clenching a horseshoe nail, the cylindrical jaw bends the end of the nail downwardly, and then may be used for scraping the same. If desired, the jaw 15 may be used for bending the end of the nail as shown in Fig. 2, and afterward, reverse the tool and use the cylindrical jaw 23 to scrape the nail.

The invention having been set forth, what is claimed as new and useful is:—

1. In combination, a pair of oppositely disposed correspondingly shaped plates, a pair of levers, one having a head pivoted between said plates and having teeth substantially alined with the lever, the other lever having an angular portion overlying the head of the other lever and terminating in a head pivotally mounted between said plates and alined with the first head, the head of the angular portion having teeth meshing with the teeth of the first head and having an elongated partially compound curved jaw offset from alinement with the lever of the angular portion and being substantially alined with the opposite lever, a jaw member pivoted between said plates and having gear connections with the head of the angular portion and terminating in a cylindrical jaw, said jaws having ratchet teeth upon their adjacent faces.

2. In combination, a pair of oppositely disposed correspondingly shaped plates, a pair of levers, one having a head pivoted between said plates and having teeth substantially alined with the lever, the other lever having an angular portion overlying the head of the other lever and terminating in a head pivotally mounted between said plates and alined with the first head, the head of the angular portion having teeth meshing with the teeth of the first head and having an elongated partially compound curved jaw offset from alinement with the lever of the angular portion and being substantially alined with the opposite lever, a jaw member pivoted between said plates and having gear connections with the head of the angular portion and terminating in a cylindrical jaw, said jaws having ratchet teeth upon their adjacent faces, and a single tooth on the first head to contact with the opposite lever to limit the levers in their movements toward each other, which correspondingly limits the movement of the jaws.

In testimony whereof I have signed my name to this specification in the presence of two subscribing witnesses.

JENS P. ANDERSON.

Witnesses:
 PHEBE M. CHITTY,
 A. W. SJOHOLM.

Copies of this patent may be obtained for five cents each, by addressing the "Commissioner of Patents, Washington, D. C."